(12) United States Patent
Weber (10) Patent No.: US 11,165,878 B2
(45) Date of Patent: Nov. 2, 2021

(54) SYSTEM FOR AUTOMATED CONTENT DELIVERY TO HIGH-SPEED DATA SERVICE CLIENT USING REDIRECTION OF INTERNET PROTOCOL SERVICE FLOWS INDEPENDENT OF PHYSICAL MEDIA DELIVERY MECHANISMS

(71) Applicant: Buckeye Cablevision, Inc., Northwood, OH (US)

(72) Inventor: Brian J. Weber, Toledo, OH (US)

(73) Assignee: BUCKEYE CABLEVISION, INC., Northwood, OH (US)

( * ) Notice: Subject to any disclaimer, the term of this patent is extended or adjusted under 35 U.S.C. 154(b) by 0 days.

(21) Appl. No.: 16/919,475

(22) Filed: Jul. 2, 2020

(65) Prior Publication Data

US 2021/0006635 A1 Jan. 7, 2021

Related U.S. Application Data (60) Provisional application No. 62/870,215, filed on Jul. 3, 2019.

(51) Int. Cl.
*H04L 29/08* (2006.01)
*H04L 12/66* (2006.01)
(Continued)

(52) U.S. Cl.
CPC .......... *H04L 67/2814* (2013.01); *H04L 12/14* (2013.01); *H04L 12/66* (2013.01);
(Continued)

(58) Field of Classification Search
CPC ......... H04L 12/14; H04L 12/66; H04L 43/16; H04L 67/2814
See application file for complete search history.

(56) References Cited

U.S. PATENT DOCUMENTS 7,849,502 B1 * 12/2010 Bloch .................. H04L 63/168
726/11
8,200,842 B1 * 6/2012 Lau ...................... H04L 43/0817
709/245

(Continued)

OTHER PUBLICATIONS

Canadian Patent Office; Examination Report dated Jul. 28, 2021; cited in Canadian Patent Application No. 3,085,604; 4 pages.

*Primary Examiner* — Shean Tokuta
(74) *Attorney, Agent, or Firm* — Shumaker, Loop & Kendrick, LLP; Patrick B. Horne (57) ABSTRACT

Embodiments for automated content delivery to high-speed data service client using redirection of IP service flows independent of physical media delivery mechanisms add, by a backend environment, an Internet gateway media access control (MAC) address to a content triggered service; send, by the backend environment, a request to a re-direct system for the Internet gateway MAC address to be added to a re-direct list; route, by the backend environment, all Internet traffic to the content playback system; display, by the content playback system, content to a subscribing user until a quota is achieved; and instruct the re-direct system to remove the Internet gateway MAC address from the re-direct list, thereby enabling user devices operatively coupled to the Internet gateway unfettered, monitored Internet access; set a usage threshold; and, in response to the usage threshold expiring, instruct the re-direct system to add the Internet gateway MAC address to the re-direct list.

18 Claims, 4 Drawing Sheets

(51) Int. Cl.
*H04L 12/14* (2006.01)
*H04L 12/26* (2006.01)
*H04L 29/12* (2006.01)

(52) U.S. Cl.
CPC .......... *H04L 43/16* (2013.01); *H04L 61/2007* (2013.01); *H04L 61/6022* (2013.01)

(56) References Cited

U.S. PATENT DOCUMENTS

| | | | |
|---|---|---|---|
| 2011/0302321 A1* | 12/2011 | Vange | G06F 9/505 709/241 |
| 2011/0320592 A1* | 12/2011 | Kemmerer, Jr. | H04L 67/2852 709/224 |
| 2013/0276135 A1* | 10/2013 | Conklin | H04L 63/0227 726/27 |
| 2014/0059190 A1* | 2/2014 | Calo | H04L 47/10 709/221 |
| 2016/0337397 A1* | 11/2016 | Li | H04L 63/1458 |
| 2017/0265246 A1* | 9/2017 | De Kievit | H04W 4/60 |
| 2019/0197587 A1* | 6/2019 | Paul | H04N 21/4788 |
| 2019/0199650 A1* | 6/2019 | Donzis | H04L 63/1416 |
| 2021/0006635 A1* | 1/2021 | Weber | H04L 43/0876 |

* cited by examiner

FIG. 4

SYSTEM FOR AUTOMATED CONTENT DELIVERY TO HIGH-SPEED DATA SERVICE CLIENT USING REDIRECTION OF INTERNET PROTOCOL SERVICE FLOWS INDEPENDENT OF PHYSICAL MEDIA DELIVERY MECHANISMS

This application claims priority to U.S. Provisional Application No. 62/870,215, filed Jul. 3, 2019, entitled "SYSTEM FOR AUTOMATED CONTENT DELIVERY TO HIGH-SPEED DATA SERVICE CLIENT USING REDIRECTION OF INTERNET PROTOCOL SERVICE FLOWS INDEPENDENT OF PHYSICAL MEDIA DELIVERY MECHANISMS," which is hereby incorporated herein in its entirety.

FIELD

This invention relates generally to the field of Internet service provisioning, and more particularly embodiments of the invention relate to a system for content supported high-speed data service delivery independent of media delivery mechanisms.

BACKGROUND

Internet service providers, cable companies, and other telecommunications organizations create infrastructure to provide high speed data connections for end users—both businesses and residential customers. In some situations, access to such a service is expensive and can represent a significant expense to a family. Accordingly, what is needed is a system for providing high-speed data service delivery independent of media delivery mechanisms.

BRIEF SUMMARY

Embodiments of the present invention address the above needs and/or achieve other advantages by providing apparatuses (e.g., a system, computer program product, and/or other devices) and methods that provide high-speed data service delivery independent of media delivery mechanisms in response to a user's viewing of content or performing some other triggering action.

Embodiments of the present invention disclose systems and methods for content triggered high-speed data service delivery independent of media delivery mechanisms.

According to embodiments of the invention, a backend environment for content triggered high-speed data (HSD) service delivery independent of media delivery mechanisms, the environment includes a backend system comprising a memory device; and a processing device operatively coupled to the memory device, wherein the processing device is configured to execute computer-readable program code to add an Internet gateway address to a content triggered service; a content playback system comprising a memory device; and a processing device operatively coupled to the memory device, wherein the processing device is configured to execute computer-readable program code to send a request to a re-direct system for the Internet gateway address to be added to a re-direct list; and a re-direct system comprising a memory device; and a processing device operatively coupled to the memory device, wherein the processing device is configured to execute computer-readable program code to route all Internet traffic intended for the Internet gateway address to the content playback system.

In some embodiments, the content playback system processing device processing device is further to display content to a subscribing user until a quota is achieved; and in response to the quota being reached, instruct the re-direct system to remove the Internet gateway address from the re-direct list. In some such embodiments, the re-direct system processing device is further configured to in response to the content playback system instructions, remove the Internet gateway address from the re-direct list, thereby enabling user devices operatively coupled to the Internet gateway unfettered, monitored Internet access. In other such embodiments, the content playback system processing device is further to set a monitored Internet usage threshold; and in response to the monitored Internet usage threshold expiring, instruct the re-direct system to add the Internet gateway address to the re-direct list. In some such embodiments, the re-direct system processing device is further configured to in response to the content playback system instructions to add the Internet gateway address to the re-direct list, route all Internet traffic intended for the Internet gateway address to the content playback system.

In some embodiments, the Internet gateway address comprises a media access control (MAC) address.

In some embodiments, routing comprises matching Internet traffic intended for the Internet gateway address to an entry in the re-direct list.

In some embodiments, the re-direct system processing device is further configured to determine that the Internet gateway address does not match any entry in the re-direct list. In some such embodiments, the re-direct system processing device is further configured to route the non-matching Internet traffic to the intended Internet gateway address rather than the content playback system.

In some embodiments, a method for content triggered high-speed data (HSD) service delivery independent of media delivery mechanisms comprises (a) adding, by a backend system of a backend environment, an Internet gateway address to a content triggered service; (b) sending, by a content playback system of the backend environment, a request to a redirect system for the Internet gateway address to be added to a re-direct list; and (c) routing, by a re-direct system of the backend environment, all Internet traffic intended for the Internet gateway address to the content playback system. In some such embodiments, the method includes (d) displaying, by the content playback system, content to a subscribing user until a quota is achieved; and (e) instructing, by the content playback system, the re-direct system to remove the Internet gateway address from the re-direct list. In some such embodiments, the method includes (f) in response to the content playback system instructions, removing, by the re-direct system, the Internet gateway address from the re-direct list, thereby enabling user devices operatively coupled to the Internet gateway unfettered, monitored Internet access.

In some embodiments, the method includes (g) setting, by the content playback system, a usage threshold; and (h) in response to the usage threshold expiring, instructing, by the content playback system, the re-direct system to add the Internet gateway address to the re-direct list. In some such embodiments, the method includes (i) in response to the content playback system instructions to add the Internet gateway address to the re-direct list, routing all Internet traffic intended for the Internet gateway address to the content playback system.

In some embodiments, the Internet gateway address comprises a media access control (MAC) address.

In some embodiments, routing comprises matching Internet traffic intended for the Internet gateway address to an entry in the re-direct list.

In some embodiments, the method also includes (j) determining that the Internet gateway address does not match any entry in the re-direct list. In some such embodiments, the method also includes (k) routing the non-matching Internet traffic to the intended Internet gateway address rather than the content playback system.

According to some embodiments, a backend environment for content triggered high-speed data (HSD) service delivery independent of media delivery mechanisms, the environment comprising a billing system comprising a memory device; and a processing device operatively coupled to the memory device, wherein the processing device is configured to execute computer-readable program code to add an Internet gateway media access control (MAC) address to a content triggered service; a content playback system comprising a memory device; and a processing device operatively coupled to the memory device, wherein the processing device is configured to execute computer-readable program code to send a request to a re-direct system for the Internet gateway MAC address to be added to a re-direct list; a redirect system comprising a memory device; and a processing device operatively coupled to the memory device, wherein the processing device is configured to execute computer-readable program code to route all Internet traffic to the content playback system; wherein the content playback system processing device is further to display content to a subscribing user until a quota is achieved; and instruct the re-direct system to remove the Internet gateway MAC address from the re-direct list; wherein the re-direct system processing device is further to in response to the content playback system instructions, remove the Internet gateway MAC address from the redirect list, thereby enabling user devices operatively coupled to the Internet gateway unfettered, monitored Internet access; wherein the content playback system processing device is further to set a usage threshold; and in response to the usage threshold expiring, instruct the re-direct system to add the Internet gateway MAC address to the re-direct list.

According to embodiments of the invention, a method for content triggered high-speed data (HSD) service delivery independent of media delivery mechanisms includes adding, by a billing system of a backend environment, an Internet gateway media access control (MAC) address to a content triggered service; sending, by a content playback system of the backend environment, a request to a re-direct system for the Internet gateway MAC address to be added to a re-direct list; routing, by a re-direct system of the backend environment, all Internet traffic to the content playback system; displaying, by the content playback system, content to a subscribing user until a quota is achieved; and instructing, by the content playback system, the re-direct system to remove the Internet gateway MAC address from the re-direct list; in response to the content playback system instructions, remove, by the re-direct system, the Internet gateway MAC address from the re-direct list, thereby enabling user devices operatively coupled to the Internet gateway unfettered, monitored Internet access; setting, by the content playback system, a usage threshold; and in response to the usage threshold expiring, instructing, by the content playback system, the re-direct system to add the Internet gateway MAC address to the redirect list.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Previous content (e.g., advertisement) delivery systems exist for specific types of applications (HULU, YouTube, FaceBook, Boingo, etc.). The systems represented by embodiments of the present invention are non-specific and will re-direct Internet and high speed data traffic without regard to application or device. The re-direction function is triggered through configurable parameters within this platform. The platform consists of a combination of proprietary software written for this application that controls all aspects of the management of customer/subscriber data traffic in a closed service provider data network.

WIFI captive proxy systems used by Boingo, RaGaPa, and ALEPO use a subset of this method, but do so for public paid subscription Internet access for wireless 802.11 network access only. These systems allow only one path from the subscriber to the Internet through a proxy server. This system leverages the aforementioned playback system only (similar to a Blu-ray player) and manipulates data network IP router traffic to connect and disconnect the customer/subscriber from the playback system for the purpose of viewing advertisements.

The present invention relates to an integration of previously existing, and some newly created subsystems that facilitate the delivery of a non-fee based, content (e.g., advertisement) supported high speed Internet service product. The system is capable of being integrated with a service operator's existing billing system platform to provision, maintain and support a customer/subscriber's Internet access. The system is designed to provide this service independent of the technical delivery mechanism, and currently provides service over wired (copper and coaxial cable), fiber optic and wireless delivery systems.

This invention can be used with any existing high speed data network and Internet access system, without regard to delivery mechanism, and without the need to alter infrastructure through the use of proxy servers. It can be used and controlled by any billing system platform as well through the use of Application Program Interfaces (APIs).

The immediate use of the invention will be to provide ubiquitous Internet access for those customers/Subscribers who cannot afford a standard monthly fee. The system will be supported by funding gained through the dissemination of paid advertising revenue. This will open access to 100% of connected households within the existing service provider area. This ostensibly provides "free" Internet service for those who cannot otherwise afford it.

Accordingly, embodiments of the present invention disclose a system for content triggered high-speed data service delivery independent of media delivery mechanisms. The system and/or service described herein may be referred to as the content triggered system or service (CTS). A backend system receives instructions from high-speed data customer indicating a selection of content triggered data service delivery; in response to receiving the instructions, enables content triggered data service delivery; (i) causes a gateway to cut-off HSD service or (ii) cuts-off supply to the gateway; causes a specified device connected to the gateway on its customer side to run a triggering content; and, in response to completion of running of the triggering content on the specified device, (i) causes the gateway to cut-on HSD service for the customer, or (ii) cutting on HSD service to the gateway and customer.

Figure 1:
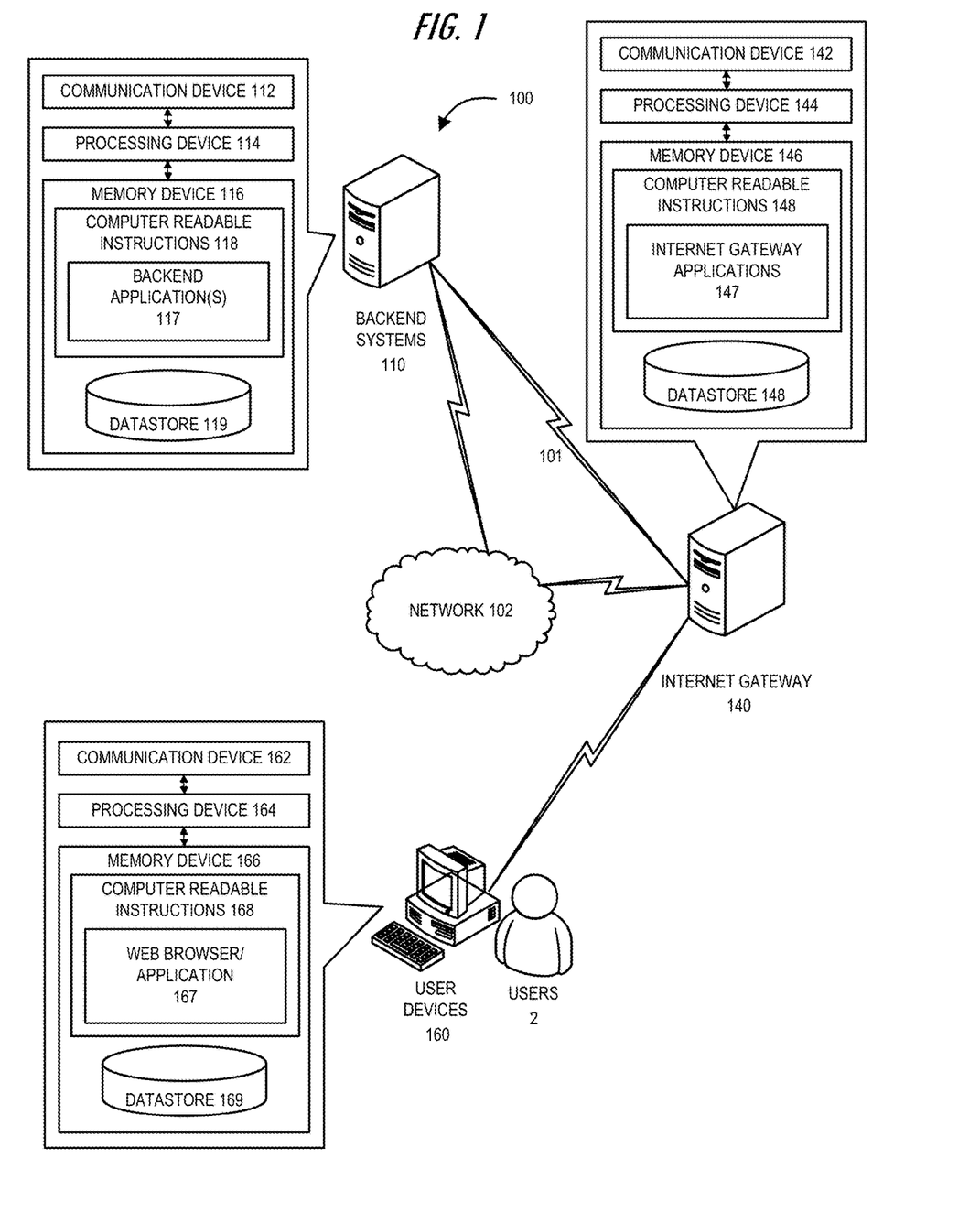
FIG. 1 illustrates an environment in which systems operate according to embodiments of the invention.

Referring now to FIG. 1, a data service environment 100 in which systems operate according to embodiments of the invention. The data service environment 100, in accordance with an embodiment of the present invention. As illustrated in the data service environment 100 of FIG. 1, the user devices 160 are operatively coupled, via an Internet gateway 140, and either (i) through the network 102 or directly (or indirectly) through connection 101 to the backend systems 110, and/or other systems of an entity, such as an Internet service provider (ISP). The ISP provides data services for end users in such a configuration through the Internet gateway 140. In this way, the user 2 may utilize the user devices 160 to access the Internet through the Internet gateway 140. FIG. 1 illustrates only one example of embodiments of a data service environment 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 1, the user devices 160 may include a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate, via the Internet gateway 140 with the network 102 and other devices on the network 102, such as, but not limited to, the backend systems 110 and/or other devices, servers, systems or the like. As such, the communication device 162 generally comprises a modem, server, WiFi capabilities, Bluetooth capabilities, or other device for communicating with the Internet gateway 140, and a display, camera, keypad, touchpad, mouse, keyboard, microphone, and/or speakers for communicating with one or more users 102. The user devices 160 may be or include, for example, a personal computer, a laptop, a mobile device (e.g., phone, smartphone, tablet, or the like), Internet of things (JOT) devices, connected devices, smart home devices, or other like devices whether or not the devices are mentioned within this specification. In some embodiments, the user devices 160 could include a data capture device that is operatively coupled to the communication device 162, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 1, the user devices 160 include computer-readable instructions 168 stored in the memory device 166, which in one embodiment includes the computer-readable instructions 168 of a web browser/application 167. In some embodiments, the memory device 166 includes a datastore 169 for storing data related to the user devices 160, including but not limited to data created and/or used by the web browser/application 167. As discussed above the web browser/application 167 allows the users 2 to interact over the Internet through the Internet gateway 140.

As further illustrated in FIG. 1, the backend systems 110 generally include a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user devices 160 through the Internet gateway 140. As such, the communication device 112 generally comprises a modem, server, WiFi capabilities, Bluetooth capabilities or other device(s) for communicating with other systems on the network 102 (i.e., the Internet).

As illustrated in FIG. 1, the backend systems 110 also may include computer-readable program instructions 118 stored in the memory device 116, which in one embodiment includes the computer-readable instructions 118 of a backend application 117. In some embodiments, the memory device 116 includes a datastore 119 for storing data related to the backend systems 110, including but not limited to data created and/or used by the backend application 117.

The backend system 110 may be or include one or more billing systems, re-direct systems, triggering content (i.e., advertisement) playback systems, and/or the like. Thus, the backend application(s) 117 may be or include one or more billing applications that processes transactions with the user, a device connected to the Internet gateway 140 or otherwise, one or more re-direction applications that re-direct a user's and/or device's interactions over the Internet gateway 140 and/or the network 102, one or more triggering content playback TCP applications, or the like. The TCP application may, in some embodiments, transmit a content file or content packet with instructions to playback the content file. Such a transmission may be sent from the backend system 110 through the Internet gateway 140 to one or more specified user devices 160 for viewing by a user 2. In another embodiment, the TCP application opens a content file or packet, plays the content, and streams the content through the Internet gateway 140 to one or more specified devices 160 for viewing by a user 2. In another embodiment, the TCP application sends content files to the Internet gateway 140 and/or the user devices 160, and in some cases, sends instructions to playback the files immediately or upon occurrence of one or more triggering events.

As further illustrated in FIG. 1, the Internet gateway 140 may include a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the backend systems 110, and provides a gateway between the user devices 160 and the network 102. As such, the communication device 142 generally comprises a modem, server, or other devices for communicating with the network 102 and/or backend systems 110. In some embodiments, the Internet gateway is coupled with a cable modem or other device that is connected between the Internet gateway 140 and the network 102 and/or backend systems 110.

As illustrated in FIG. 1, the Internet gateway 140 may include computer-readable program instructions 148 stored in the memory device 146, which in one embodiment includes the computer-readable instructions 148 that may include one or more Internet gateway applications 147. In some embodiments, the memory device 146 includes a datastore 149 for storing data related to the Internet gateway 140, including but not limited to data created and/or used by the Internet gateway applications 147.

Figure 2:
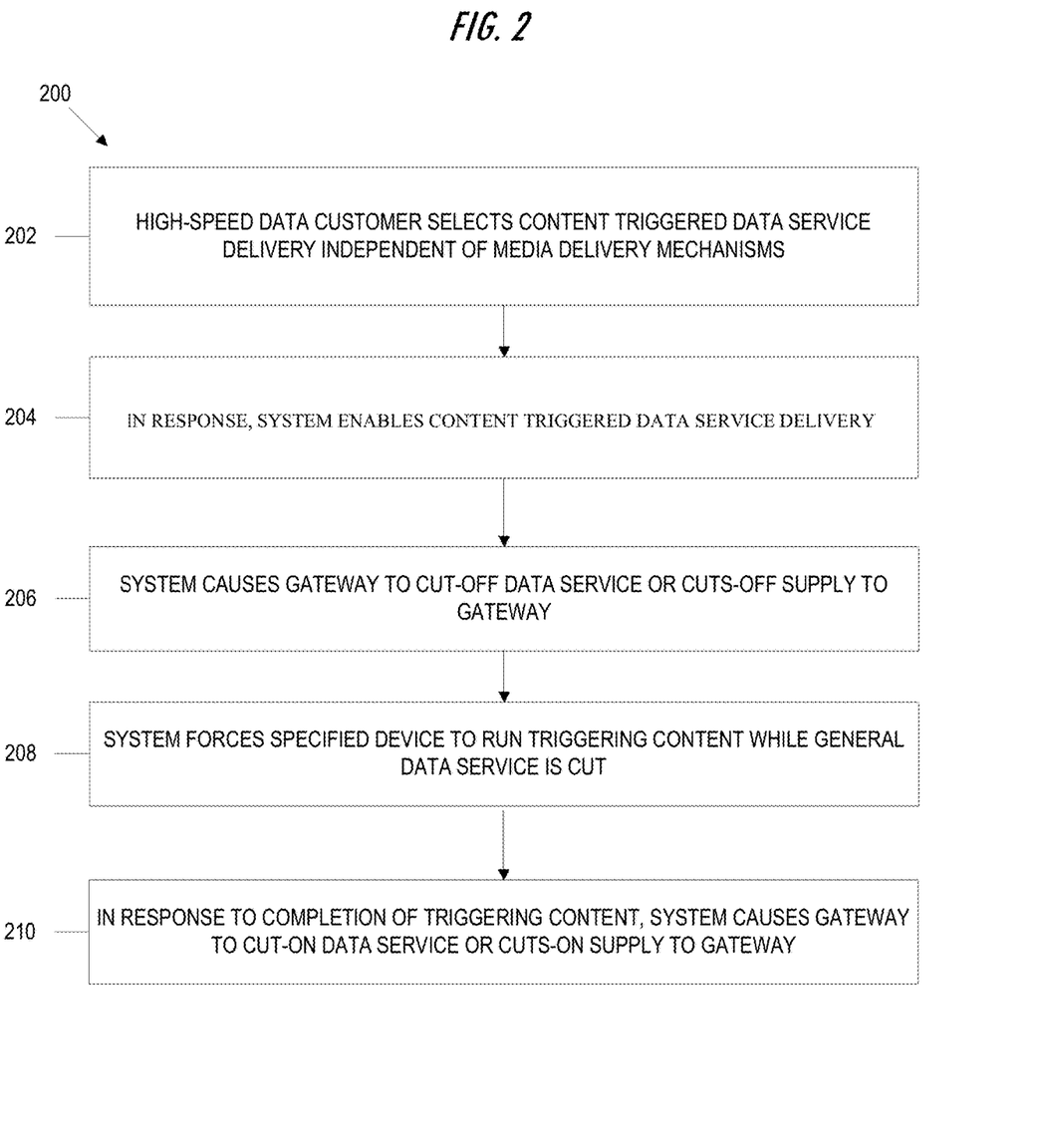
FIG. 2 is a flowchart illustrating a method for content triggered high-speed data service delivery according to embodiments of the invention.

Referring now to FIG. 2, a flowchart illustrates a method for content triggered high-speed data service delivery independent of media delivery mechanisms. The first step, as represented by block 202, is that a high-speed data customer selects content triggered data service delivery. Such delivery is independent of media delivery mechanisms. The next step, as represented by block 204, is that the system enables content triggered data service delivery in response to the customer selection. Next, as represented by block 206, in some embodiments, the system causes the gateway to cut-off data service. In other embodiments, the system cuts-off the supply to the gateway. The next step, as represented by block 208, is for the system to force a specified device to run triggering content while general data service is cut. Finally, as represented by block 210, in response to completion of triggering content, the system causes the gateway to cut-on data service in some embodiments. In other embodiments, in response to completion of triggering content playback, the system cuts-on the supply to the gateway.

Automatic Content Playback

The base ALEPO WIFI advertising platform performs playback and captive portal service. This is an aspect of the Invention. The invention does not use a proxy server methodology to capture the customer/subscriber, but rather a network re-director. The invention tracks and monitors the customer/subscriber's unobstructed high speed data and Internet usage over time, and re-directs the customer's viewing to the playback system. The system keeps this in cycle until directed by the content triggered system (CTS) to un-subscribe the customer.

Embodiments of the present invention improve upon prior art systems at least by being independent of media type, and independent, but able to be integrated with multiple billing system platforms.

The system can be used for controlled access in both residential and commercial environments, and is able to regulate Internet usage by time, independent of the end application employed by the subscriber, or the physical media used to transport the data to and from the subscriber's end device. The system regulates high speed data network access for all use conditions such as main screen television/video, web browsing for any device type, Internet phone, security systems or any Internet of Things (IoT) application. The advertisement playback system can be configured, by specific advertisement, to present to specific demographically identified person(s) for variable time periods. The system works by using a Re-direct system based upon IEEE MAC addresses rather than Internet Protocol (IP) addresses and therefore can be used with any version of IP (version 4 or 6) without modification.

Through the use of an existing automated advertisement playback system, this new system tracks the connection to the Internet for each subscribed household, using IEEE 8022001 Media Access Control (MAC) addresses to monitor the use of Internet services. The use of services is measured by the system for the amount of time the Internet is in use. When a predetermined time has been reached, the system will request to the Re-direct System to route all Internet traffic to the automated advertisement playback system. An advertisement quota will be defined (variably) for each subscribing household or group of households, such that content, such as an advertisement or advertisements, will be displayed to that target person or group. Once the quota has been satisfied, the system will request of the Redirect System that the subscriber be directed back to unfettered, but monitored, Internet access. The system will continue to monitor the amount of time the subscriber is accessing the Internet until the first predetermined timer has been reached. Once reached, the system will initiate a new request to the Re-direct System to return that subscriber's Internet traffic to the automated advertisement playback system to meet a new advertisement viewing quota. This process continues until the subscriber is removed from his or her subscription through the automated billing system provisioning to a new service, or disconnection from the service provider altogether.

Embodiments of the present invention disclose a system for automated content delivery to high-speed data service client using redirection of IP service flows independent of physical media delivery mechanisms. Embodiments add, by a billing system of a backend environment, an Internet gateway media access control (MAC) address to a content triggered service; send, by a content playback system of the backend environment, a request to a re-direct system for the Internet gateway MAC address to be added to a re-direct list; route, by a re-direct system of the backend environment, all Internet traffic to the content playback system; display, by the content playback system, content to a subscribing user until a quota is achieved; and instruct, by the content playback system, the re-direct system to remove the Internet gateway MAC address from the re-direct list; in response to the content playback system instructions, remove, by the re-direct system, the Internet gateway MAC address from the re-direct list, thereby enabling user devices operatively coupled to the Internet gateway unfettered, monitored Internet access; set, by the content playback system, a usage threshold; and, in response to the usage threshold expiring, instruct, by the content playback system, the re-direct system to add the Internet gateway MAC address to the re-direct list.

Figure 3:
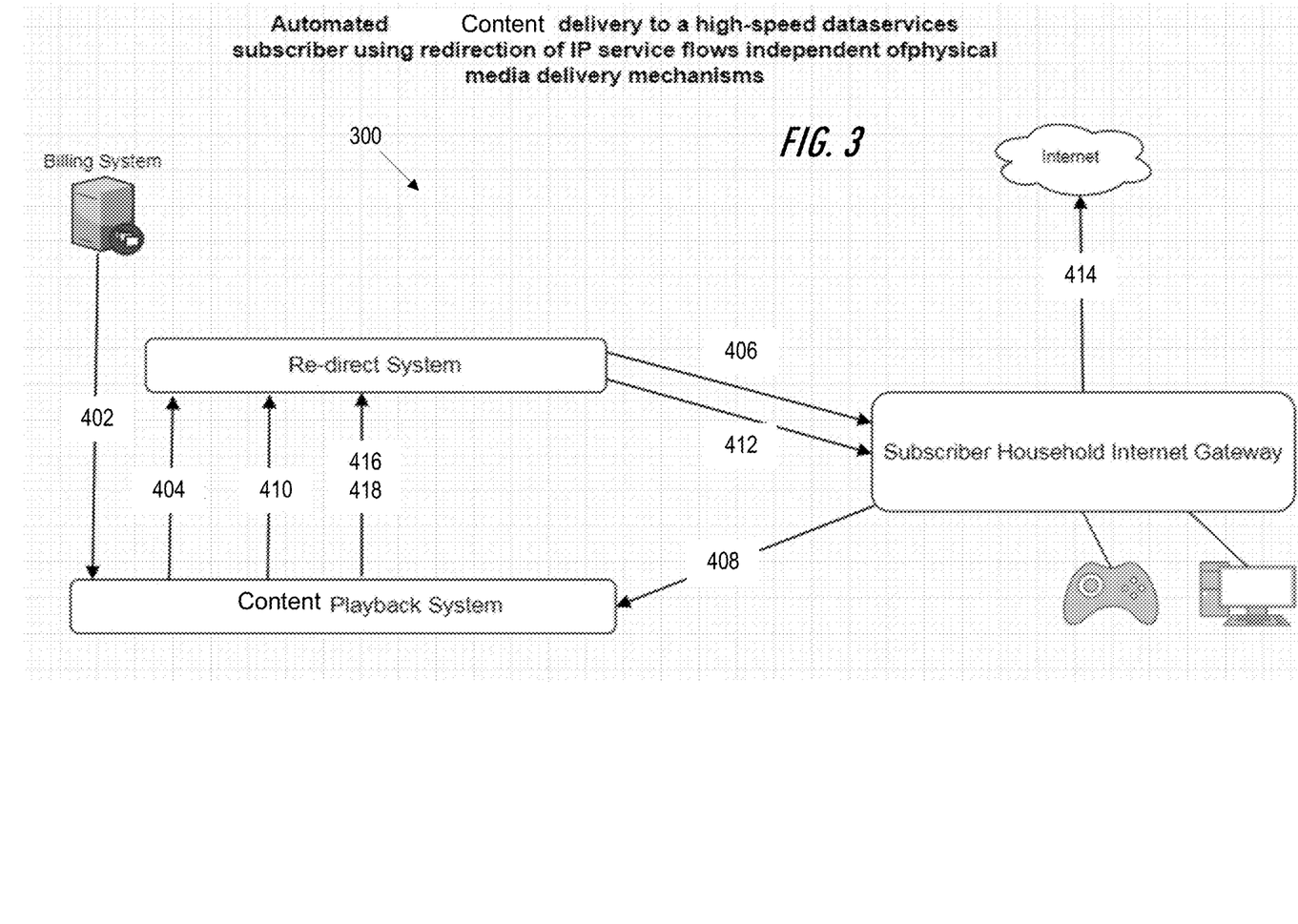
FIG. 3 is a combination flowchart and diagram illustrating methods and systems according to embodiments of the invention.

Referring now to FIG. 3, a combined flowchart and diagram illustrates a method and system according to embodiments of the present invention. FIG. 3 includes three backend systems—the billing system, the re-direct system and the content playback system. These systems interact with one another as well as the Internet gateway to accomplish processes according to embodiments of the invention. The Internet gateway, as discussed elsewhere herein, is operatively coupled with one or more user devices and provides access to a greater network such as the Internet.

Figure 4:
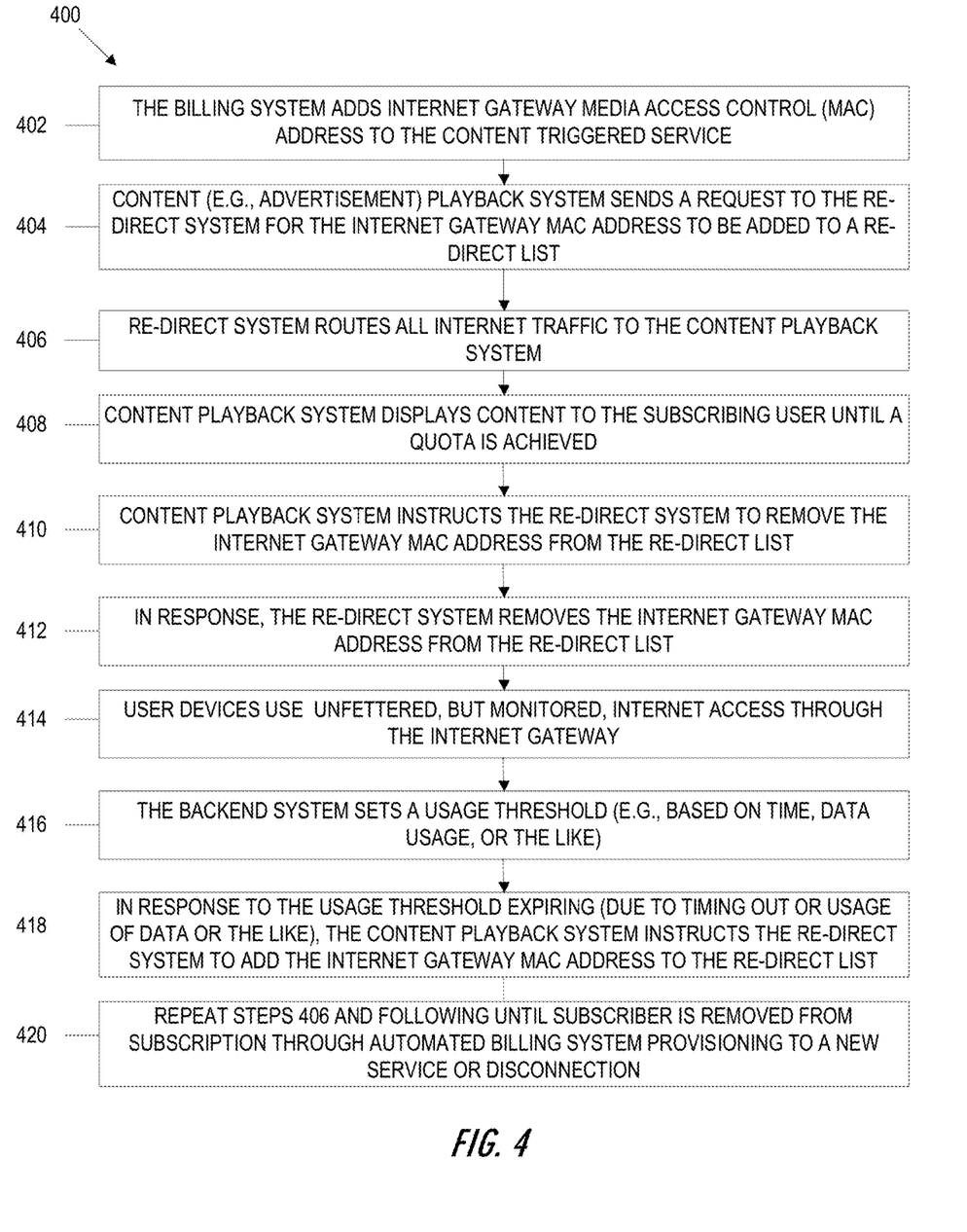
FIG. 4 is a flowchart illustrating a method for content triggered high-speed data (HSD) service delivery independent of media delivery mechanisms according to embodiments of the invention.

FIG. 4 is a flowchart illustrating a method for automated content delivery to high-speed data service client using redirection of internet protocol service flows is shown according to embodiments of the invention. Referring now concurrently to FIGS. 3 and 4, step 402 is that the billing system adds the Internet gateway media access control (MAC) address to the content triggered service. Next, in step 404, the content (e.g., advertisement) playback system sends a request to the re-direct system for the Internet gateway MAC address to be added to a re-direct list stored thereon. Then, the re-direct system routes all Internet traffic to the content playback system in step 406. Next the content playback system displays content to the subscribing user until a quota is achieved as represented by step 408. Then, at step 410, the content playback system instructs the re-direct system to remove the Internet gateway MAC address from the redirect list. In response, at step 412, the re-direct system removes the Internet gateway MAC address from the re-direct list. Then, the user devices use unfettered, but monitored, Internet access through the Internet gateway, as represented by step 414. The backend system then sets a threshold (e.g., based on time, data usage or the like), as represented by step 416. In response to the usage threshold expiring (due to timing out or usage of data or the like), the content playback system instructs the re-direct system to add the Internet gateway MAC address to the re-direct list, as represented by step 418. Finally, at step 420, steps 406, et seq., are repeated until the subscriber is removed from subscription through the automated billing system provisioning to a new service. In other situations, the process ceases when a customer's service is disconnected.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A backend environment for content triggered high-speed data (HSD) service delivery independent of media delivery mechanisms, the environment comprising:

(a) a backend system comprising:

a memory device; and
   a processing device operatively coupled to the memory device, wherein the processing device is configured to execute computer-readable program code to:
      add an Internet gateway address to a content triggered service;
(b) a content playback system comprising:
   a memory device; and
   a processing device operatively coupled to the memory device, wherein the processing device is configured to execute computer-readable program code to:
      send a request to a re-direct system for the Internet gateway address to be added to a re-direct list; and
(c) a re-direct system comprising:
   a memory device; and
   a processing device operatively coupled to the memory device, wherein the processing device is configured to execute computer-readable program code to:
      route all Internet traffic intended for the Internet gateway address to the content playback system
(d) wherein the content playback system processing device is further configured to:
   display content to a subscribing user until a quota is achieved; and
   in response to the quota being achieved, instruct the re-direct system to remove the Internet gateway address from the re-direct list.

2. The backend environment of claim 1, wherein the re-direct system processing device is further configured to:
   in response to the content playback system instructions, remove the Internet gateway address from the re-direct list, thereby enabling user devices operatively coupled to the Internet gateway unfettered, monitored Internet access.

3. The backend environment of claim 1, wherein the content playback system processing device is further to:
   set a monitored Internet usage threshold; and
   in response to the monitored Internet usage threshold expiring, instruct the re-direct system to add the Internet gateway address to the re-direct list.

4. The backend environment of claim 3, wherein the re-direct system processing device is further configured to:
   in response to the content playback system instructions to add the Internet gateway address to the re-direct list, route all Internet traffic intended for the Internet gateway address to the content playback system.

5. The backend environment of claim 1, wherein the Internet gateway address comprises a media access control (MAC) address.

6. The backend environment of claim 1, wherein routing comprises matching Internet traffic intended for the Internet gateway address to an entry in the re-direct list.

7. The backend environment of claim 1, wherein the re-direct system processing device is further configured to:
   determine that the Internet gateway address does not match any entry in the re-direct list.

8. The backend environment of claim 7, wherein the re-direct system processing device is further configured to:
   route the non-matching Internet traffic to the intended Internet gateway address rather than the content playback system.

9. A method for content triggered high-speed data (HSD) service delivery independent of media delivery mechanisms, the method comprising:
(a) adding, by a backend system of a backend environment, an Internet gateway address to a content triggered service;
(b) sending, by a content playback system of the backend environment, a request to a redirect system for the Internet gateway address to be added to a re-direct list;
(c) routing, by a re-direct system of the backend environment, all Internet traffic intended for the Internet gateway address to the content playback system;
(d) displaying, by the content playback system, content to a subscribing user until a quota is achieved; and
(e) instructing, by the content playback system, the re-direct system to remove the Internet gateway address from the re-direct list.

10. The method of claim 9, further comprising:
(a) in response to the content playback system instructions, removing, by the re-direct system, the Internet gateway address from the re-direct list, thereby enabling user devices operatively coupled to the Internet gateway unfettered, monitored Internet access.

11. The method of claim 9, further comprising:
(a) setting, by the content playback system, a usage threshold; and
(b) in response to the usage threshold expiring, instructing, by the content playback system, the re-direct system to add the Internet gateway address to the re-direct list.

12. The method of claim 11, further comprising:
(a) in response to the content playback system instructions to add the Internet gateway address to the re-direct list, routing all Internet traffic intended for the Internet gateway address to the content playback system.

13. The method of claim 9, wherein the Internet gateway address comprises a media access control (MAC) address.

14. The method of claim 9, wherein routing comprises matching Internet traffic intended for the Internet gateway address to an entry in the re-direct list.

15. The method of claim 9, further comprising:
(a) determining that the Internet gateway address does not match any entry in the re-direct list.

16. The method of claim 15, further comprising:
(a) routing the non-matching Internet traffic to the intended Internet gateway address rather than the content playback system.

17. A backend environment for content triggered high-speed data (HSD) service delivery independent of media delivery mechanisms, the environment comprising:
a billing system comprising:
   a memory device; and
   a processing device operatively coupled to the memory device, wherein the processing device is configured to execute computer-readable program code to:
      add an Internet gateway media access control (MAC) address to a content triggered service;
a content playback system comprising:
   a memory device; and
   a processing device operatively coupled to the memory device, wherein the processing device is configured to execute computer-readable program code to:
      send a request to a re-direct system for the Internet gateway MAC address to be added to a re-direct list;
a re-direct system comprising:
   a memory device; and
   a processing device operatively coupled to the memory device, wherein the processing device is configured to execute computer-readable program code to:
      route all Internet traffic to the content playback system;

wherein the content playback system processing device is further to:
  display content to a subscribing user until a quota is achieved; and
  instruct the re-direct system to remove the Internet gateway MAC address from the re-direct list;
wherein the re-direct system processing device is further to:
  in response to the content playback system instructions, remove the Internet gateway MAC address from the re-direct list, thereby enabling user devices operatively coupled to the Internet gateway unfettered, monitored Internet access;
wherein the content playback system processing device is further to:
  set a usage threshold; and
  in response to the usage threshold expiring, instruct the re-direct system to add the Internet gateway MAC address to the re-direct list.

18. A method for content triggered high-speed data (HSD) service delivery independent of media delivery mechanisms, the method comprising:
  adding, by a backend system of a backend environment, an Internet gateway media access control (MAC) address to a content triggered service;
  sending, by a content playback system of the backend environment, a request to a re-direct system for the Internet gateway MAC address to be added to a re-direct list;
  routing, by a re-direct system of the backend environment, all Internet traffic to the content playback system;
  displaying, by the content playback system, content to a subscribing user until a quota is achieved;
  instructing, by the content playback system, the re-direct system to remove the Internet gateway MAC address from the re-direct list;
  in response to the content playback system instructions, remove, by the re-direct system, the Internet gateway MAC address from the re-direct list, thereby enabling user devices operatively coupled to the Internet gateway unfettered, monitored Internet access;
  set, by the content playback system, a usage threshold; and
  in response to the usage threshold expiring, instruct, by the content playback system, the re-direct system to add the Internet gateway MAC address to the re-direct list.

* * * * *